Patented Nov. 11, 1924.

1,514,780

UNITED STATES PATENT OFFICE.

WALTER S. MORTON, OF NEW YORK, N. Y., ASSIGNOR TO CHESHIRE KITCHENS, INC., OF NEW YORK, N. Y., A CORPORATION OF DELAWARE.

FOOD PRODUCT AND PROCESS OF MAKING THE SAME.

No Drawing. Application filed January 4, 1922. Serial No. 527,001.

*To all whom it may concern:*

Be it known that I, WALTER S. MORTON, a citizen of the United States, and a resident of New York city, in the county of New York and State of New York, have invented a new and useful Food Product and Process for Making the Same, of which the following is a specification.

My invention relates to a base for a food product and to the process of making the same and particularly to a base and the process of making the same for a Welsh rarebit.

It is an object of my invention to provide a base for Welsh rarebit which is in powdered form which will not deteriorate under ordinary conditions in an indefinite period, which may be used in the making of a Welsh rarebit merely by the addition of milk or other liquid and boiling, and which, when so used, will invariably result in a Welsh rarebit of creamy consistency, devoid of stringiness or toughness.

In order to make a Welsh rarebit possessing the most desirable characteristics as regards taste and consistency, it is necessary that the cheese used shall be what is known as full-cream cheese of which class Cheddar cheese is an example. It is an object of my invention to produce such a cheese in a form in which it will not deteriorate and will be readily useful when mixed with a seasoning mixture, as hereinafter set forth in preparing a Welsh rarebit.

Other and further objects will appear from the following specification.

Through an extensive series of carefully conducted experiments I have found that the keeping qualities of cheese depend upon the bacteria, the moisture and fat contents, and upon temperature. The presence of bacteria brings about the ripening or aging of cheese and my process for the preparation of the cheese starts with fully aged or ripened cheese. In other words it starts with cheese in its final and marketable form. By reducing the moisture content the activity of the bacteria is decreased until at a point in the reduction of moisture content the food upon which the bacteria feeds is no longer in liquid form and the bacteria assumes an inactive or spore formation. If the moisture content is further decreased the casing which maintains and protects the globules in which the fat content exists is destroyed and the fat assumes a greasy condition whereupon it may readily oxidize. It may be stated that sufficient moisture must be maintained to keep the fat in emulsion in the water rather than reducing the moisture to a point where the water is in emulsion in the fat, and the condition of the fat content is changed.

In the Cheddar cheese, or other suitable cheese which I employ the water content varies from 30% to 40%, and the fat content varies from 25% to 50%, the average water content being for New York State cheese about 36% and for Wisconsin cheese about 32%, and the average fat content being about 36%. I have found by experiment that when the moisture content of full-cream cheese in ripened or aged condition is reduced to 18% to 22% of the dehydrated residue, the bacteria become inactive, but there is nevertheless sufficient moisture present to maintain the fat in its normal state and prevent acceleration of oxidization. As a matter of fact I have found that cheese prepared in accordance with my invention will keep for a year and a half, without apparent change.

Certain cheeses such as Parmesan are cured for a long time before they are marketed and are capable of being grated and used after long periods, but the fat content of such cheese is about one-half the water content and the hardening of such cheese is a part of the process of making. But my process for preparing cheese begins with a fully ripened or aged cheese and has nothing to do with the process of making the same. And after my process has been carried out the fat content is several times greater than the water content.

The extent of ripening or aging controls the consistency and flavor of the cheese. When the process by which certain cheeses are manufactured, for example Cheddar cheese, is complete, the cheese will be edible but possibly undesirably tough and perhaps too mild. Thus although the process of manufacture is complete the cheese is allowed to stand during an aging period in which the bacteria continues to act until the consistency and flavor of the cheese have reached a state acceptable to the public. Further aging will usually impart a sharper flavor to the cheese that is desired by some, Accordingly cheese in a fully ripened state varies from a mild cheese of acceptable consistency produced as a result of the process of manufacture or by a limited amount of aging to cheese of varying degrees of sharpness of flavor produced by prolongation of the aging process. Inasmuch as one of the limitations upon the extent to which moisture may be withdrawn is that sufficient moisture will remain to protect the fat content, the removal of moisture in accordance with my invention to effect preservation of cheese will depend upon the amount of fat present. And, it is desirable to remove only enough moisture to bring the bacteria to a state of inactivity because cheese treated in accordance with my invention undergoes a further loss of moisture. Such further loss of moisture may continue until the moisture percentage is lower than the percentage to which the moisture may be reduced in accordance with my invention without danger of depriving the fat globules of proper protection. For example, with a certain cheese the moisture could be reduced to 20% in accordance with my invention, which is a desirable and generally effective percentage with respect to Cheddar cheese, and further loss of moisture thereafter might continue without danger of spoiling of the cheese until the moisture content was 15% or only 10%. Such further loss of moisture, in any event, proceeds at a slow enough rate to provide an ample period for marketing cheese preserved in accordance with my invention before the moisture reaches so low a percentage as to endanger the keeping qualities of the cheese.

In reducing the moisture content a full-cream cheese is freed of rind and impurities and granulated. It is then dried in an air draft the temperature of which never exceeds 90° F., but is preferably between 70° to 85° F., that is, it never attains a temperature which will change the condition of the fat content in any respect or melt it, or render it greasy. After the granulated cheese is dried it is reground to a finer granulated texture and if it is desired to produce a powder that may be used as a seasoning or flavoring material or from which Welsh rarebit may be made it is mixed with a suitable dry seasoning compound. I have found by extensive experiments that the seasoning compound, hereinafter specifically set forth, is such that the accidental occurrence of stringiness and toughness is impossible when the rarebit is prepared, and this advantage is attained even though it is used in connection with the dehydrated granular cheese above described, whereas it is common knowledge that a successful rarebit can only be prepared from fresh, moist, full-cream cheese, and then only through expert manipulation. I have also found that cheese which has not been dehydrated, as above described, which produces only lumpy and stringy rarebits, can be made into a creamy, non-stringy rarebit by the use of the seasoning compound herein disclosed. The avoidance of undesirable results is also attributable to the fact that the cheese is of uniform dryness and in uniform-sized particles.

With 83 parts of dehydrated granular cheese 17 parts of seasoning compound are used. An example of a desirable seasoning compound, as developed by experiment, consists in:

|  |  | Parts. |
|---|---|---|
| Flour | 1½ lbs. | 10,500 |
| Salt | 6 oz. | 2,625 |
| Bi-carbonate of soda | 400 gr. | 400 |
| Mustard | 4 oz. | 1,750 |
| White pepper | 116 gr. | 116 |
| Red pepper | 30 gr. | 30 |
| Egg albumen | 5 oz. | 2,200 |

Variations from this definite compound are, however permissible and the following table indicates the range of variations which experiments and tests have shown to give uniformly satisfactory results:

| | Parts. |
|---|---|
| Flour | 9,000 to 12,000 |
| Salt | 2,000 to 3,000 |
| Bi-carbonate of soda | 350 to 450 |
| Mustard | 1,500 to 1,800 |
| Pepper | 100 to 200 |
| Egg albumen | 1,700 to 2,700 |

One modification of this seasoning compound consists in the omission of the albumen which is a thickening agent and the substitution of three to five times as much flour in addition to the stated amount of flour. Another modification consists in the addition of 24 parts of coloring matter. Various modifications of the quantities and ingredients may be made within reasonable limits. The egg albumen may be either dried whites or yolks of eggs or both.

Although moist cheese is considered essential and the cheese prepared as above set forth is dried to its practical limit, numerous experiments have revealed no way of producing a stringy, lumpy or tough rarebit when my dehydrated cheese is used with the above seasoning compound containing flour, (or albumen and flour) soda and condiments.

In order to make a Welsh rarebit from this base comprising dehydrated cheese and seasoning compound an ounce of powder is mixed with three ounces or more of milk, water, beer or even soup stock and boiled two or three minutes until it acquires a creamy consistency.

While I have set forth in specific details the various proportions it is to be understood that I do not confine my invention to the proportions stated, but intend that various reasonable modifications may be made and that my invention shall be defined by the hereunto appended claims.

Having thus described my invention, what I claim as new and desire to secure by Letters Patent, is—

1. A food base comprising granulated full-cream cheese having its moisture content reduced to 18% to 22% in the proportion of 82 to 84 parts by weight and an admixture in the proportion of 18 to 16 parts comprising 9,000 to 12,000 parts flour, 2000 to 3000 parts salt, 350 to 450 parts bi-carbonate of soda, 1500 to 1800 parts mustard, 100 to 200 parts pepper and 2700 to 1700 parts egg albumen, all parts being by weight.

2. A food base comprising granulated full-cream cheese having its water content reduced to 18% to 22%, flour, bi-carbonate of soda, salt, mustard, pepper and albumen.

3. A food base comprising granulated full-cream cheese having its moisture content reduced to 18% to 22% in the proportion of 82 to 84 parts by weight and an admixture in the proportion of 18 to 16 parts comprising flour, albumen, bi-carbonate of soda and condiments.

4. A seasoning compound for full-cream-cheese Welsh rarebit comprising 9,000 to 12,000 parts flour, 2,000 to 3,000 parts salt, 350 to 450 parts bi-carbonate of soda, 1500 to 1800 parts mustard, 100 to 200 parts pepper and 2700 to 1700 parts egg albumen, all parts being by weight.

5. The process of preparing fully ripened cheese consisting in reducing its moisture content to a point between that at which bacterial action substantially ceases and that at which the fat content is insufficiently protected.

6. The process of preparing fully ripened, full-cream cheese consisting in reducing its moisture content to 18% to 22%.

7. The process of preparing fully ripened cheese consisting in reducing its moisture content, at a temperature below that at which the fat content is affected, to a point between that at which bacterial action substantially ceases and that at which the fat content is insufficiently protected.

8. The process of preparing fully ripened full-cream cheese which consists in reducing its moisture content to 22% at a temperature not exceeding 90° Fah.

9. A granular Welsh rarebit base comprising cheese the water content of which is reduced to 18% to 22% and a dry seasoning mixture.

10. The process of preparing fully ripened, full-cream cheese consisting in reducing its moisture content to 18% to 22% at a temperature below that at which the fat content is affected.

11. A food base comprising granulated full-cream-cheese the moisture content of which is reduced to 18% to 22%, and the fat content of which is substantially the same in character as that of the cheese before reduction of moisture content.

In testimony whereof, I have signed my name to this specification.

WALTER S. MORTON.